(12) United States Patent
Park et al.

(10) Patent No.: US 9,489,105 B2
(45) Date of Patent: Nov. 8, 2016

(54) DISPLAY DEVICE AND METHOD FOR CONTROLLING THE SAME

(71) Applicant: Samsung Display Co., Ltd., Yongin, Gyeonggi-do (KR)

(72) Inventors: Jae Hyun Park, Suwon-si (KR); Jun Hyuk Cheon, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 209 days.

(21) Appl. No.: 14/144,421

(22) Filed: Dec. 30, 2013

(65) Prior Publication Data

US 2015/0058765 A1 Feb. 26, 2015

(30) Foreign Application Priority Data

Aug. 26, 2013 (KR) .................. 10-2013-0101220

(51) Int. Cl.
*G06F 3/0481* (2013.01)
*G06F 3/0484* (2013.01)
*G06F 3/0488* (2013.01)

(52) U.S. Cl.
CPC ......... *G06F 3/04817* (2013.01); *G06F 3/0488* (2013.01); *G06F 3/04842* (2013.01)

(58) Field of Classification Search
None
See application file for complete search history.

(56) References Cited

U.S. PATENT DOCUMENTS

| 8,826,178 | B1* | 9/2014 | Zhang | G06F 1/1694 345/173 |
| 2008/0174562 | A1* | 7/2008 | Kim | G06F 3/04886 345/173 |
| 2010/0117975 | A1* | 5/2010 | Cho | G06F 1/1626 345/173 |
| 2010/0241979 | A1* | 9/2010 | Apted | G06F 3/0481 715/765 |
| 2010/0313124 | A1* | 12/2010 | Privault | G06F 3/0488 715/702 |
| 2011/0164063 | A1* | 7/2011 | Shimotani | G06F 3/0416 345/661 |
| 2012/0026113 | A1* | 2/2012 | Kasahara | G06F 3/04883 345/173 |

FOREIGN PATENT DOCUMENTS

| KR | 10-2006-0110502 A | 10/2006 |
| KR | 10-2009-0006781 A | 1/2009 |
| KR | 10-2010-0052227 A | 5/2010 |
| KR | 10-2012-0011271 A | 2/2012 |

OTHER PUBLICATIONS

Lee et al., Flexible Display, Special Feature on IT Core Component Technology, Dec. 2005, 15 Pages, vol. 20, Issue 6, Electronics and Telecommunications Research Institute, Korea.

* cited by examiner

*Primary Examiner* — Jeffrey A Gaffin
*Assistant Examiner* — Nhat-Huy T Nguyen
(74) *Attorney, Agent, or Firm* — Lewis Roca Rothgerber Christie LLP

(57) ABSTRACT

A display device includes: a display having a plurality of display regions on a body that are configured to display images; a touch sensor configured to sense a first touch input; and a controller configured to control the images displayed on the plurality of display regions in response to the first touch input sensed by the touch sensor, wherein the controller is further configured to control the display to display at least one piece of content at at least one of the plurality of display regions, and to move the at least one piece of content to a first display region from among the plurality of display regions and to display the moved content at the first display region in response to the first touch input when the touch sensor senses the first touch input generated at the first display region.

18 Claims, 7 Drawing Sheets

DISPLAY DEVICE AND METHOD FOR CONTROLLING THE SAME

CROSS-REFERENCE TO RELATED APPLICATION

This application claims priority to and the benefit of Korean Patent Application No. 10-2013-0101220, filed on Aug. 26, 2013 in the Korean Intellectual Property Office, the disclosure of which is incorporated herein in its entirety by reference.

BACKGROUND

1. Field

Embodiments of the present invention relate to a display device and a method for controlling the same.

2. Description of the Related Art

A display device that includes a touch screen has been applied to various terminals and electronics. For example, display devices have been widely applied to mobile terminals (e.g., mobile devices), such as portable phones, tablet PCs, and notebook computers.

Further, display devices have been widely applied to stationary terminals (e.g., stationary devices), such as display devices for exhibition that are displayed indoors or outdoors. The display device for exhibition may be installed in a museum or an exhibition hall to provide information on exhibits, or may be installed in a subway station, a shopping mall, or an airport to provide advertisements. The display device for exhibition as described above may provide content that can be selected by a user and that can provide corresponding information or that can functionally interact with a user in response to a user's selection input.

SUMMARY

In the case where a display device is used for display as described above, an image that is displayed on the display device may be provided only in one direction (e.g., a forward direction or direction toward a viewer). Accordingly, in order to select content being displayed, a user should move to a position where the corresponding content is displayed, which may cause inconvenience during use.

Accordingly, embodiments of the present invention provide a display device and a method for controlling the same that may move content that is displayed on the display device to a portion of the display device where an input is generated by a user, and displays the moved content on the portion.

Additional aspects, subjects, and features of embodiments of the present invention will be set forth in part in the description which follows and in part will become apparent to those having ordinary skill in the art upon examination of the following, or may be learned from practice of embodiments of the present invention.

In one embodiment of the present invention, there is provided a display device including: a display having a plurality of display regions on a body that are configured to display images; a touch sensor configured to sense a first touch input; and a controller configured to control the images displayed on the plurality of display regions in response to the first touch input sensed by the touch sensor, wherein the controller is further configured to control the display to display at least one piece of content at at least one of the plurality of display regions, and to move the at least one piece of content to a first display region from among the plurality of display regions and to display the moved content at the first display region in response to the first touch input when the touch sensor senses the first touch input generated at the first display region.

The controller may be further configured to control a moving velocity of the at least one piece of content in proportion to a distance between a position of the at least one piece of content before being moved and a point where the first touch input is generated.

When the first touch input that is sensed by the touch sensor continues over a time period, the controller may be further configured to display the at least one piece of content at a point where the first touch input is generated in a concentrated manner.

When the first touch input that continued over the time period is released, the controller may be further configured to realign the at least one piece of content that was concentrated and to display the realigned content at the first display region.

The at least one piece of content may be an icon.

When the touch sensor senses a second touch input for selecting the displayed icon, the controller may be further configured to perform an operation corresponding to the selected icon in response to the second touch input.

The controller may be further configured to display an operation screen, according to performance of the corresponding operation, at the first display region.

The display may be formed at an outer circumference of the body.

The body may have a shape of a sphere, a hemisphere, a cone, a prism, or a cylinder.

Outer circumferences of the plurality of display regions may form a closed loop.

The display may include a flexible display.

According to another embodiment of the present invention, a method for controlling a display device including a display configured to define a plurality of display regions may include: displaying at least one piece of content on at least one of the plurality of display regions; sensing a first touch input generated at a first display region among the plurality of display regions; moving the at least one piece of content to the first display region; and displaying the moved content at the first display region in response to the first touch input.

A moving velocity of the at least one piece of content may be in proportion to a distance between a position of the at least one piece of content before being moved and a point where the first touch input is generated.

The method may further include displaying the at least one piece of content at a point where the first touch input is generated in a concentrated manner when the first touch input continues over a time period.

The method may further include realigning the at least one piece of content that was concentrated and displaying the realigned content at the first display region when the first touch input that continued over the time period is released.

The at least one piece of content may be an icon.

The method may further include: sensing a second touch input for selecting any one of the at least one piece of content; and performing an operation corresponding to the selected one piece of content in response to the second touch input.

The method may further include displaying an operation screen, according to performance of the corresponding operation, at the first display region.

Outer circumferences of the plurality of display regions may form a closed loop.

The display may include a flexible display.

According to embodiments of the present invention, since it is not necessary for a user to move to a portion of a display device where content to be used by the user is displayed, user convenience may be increased.

Further, the content movement process may be displayed as an image, and thus the sense of beauty or aesthetics may be improved.

The effects according to embodiments of the present invention are not limited to the above, but further various effects are included in the description.

BRIEF DESCRIPTION OF THE DRAWINGS

The above and other embodiments, features and aspects of the present invention will be more apparent from the following detailed description taken in conjunction with the accompanying drawings, in which.

DETAILED DESCRIPTION

Figure 1:
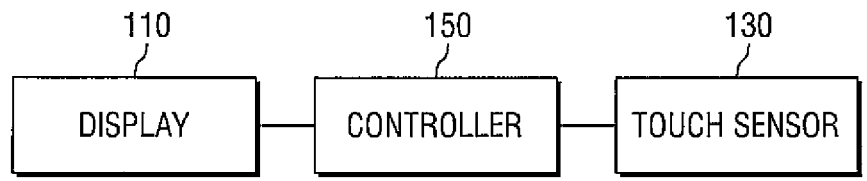
FIG. 1 is a block diagram illustrating a configuration of a display device according to an embodiment of the present invention.

Aspects and features of the present invention and methods of accomplishing the same may be understood more readily by reference to the following detailed description of example embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will be defined by the appended claims, and equivalents thereof. Like reference numbers refer to like elements throughout. In the drawings, sizes and relative sizes of layers and regions may be exaggerated for clarity.

It will be understood that when an element or layer is referred to as being "on" another element or layer, it may be directly on the other element or layer or intervening elements or layers may be present.

It will be understood that, although the terms first, second, third, etc., may be used herein to describe various elements, these elements should not be limited by these terms. These terms are only used to distinguish one element from another element. Thus, a first element discussed below may be termed a second element without departing from the teachings of the present invention.

Hereinafter, embodiments of the present invention will be described with reference to the accompanying drawings.

FIG. 1 is a block diagram illustrating a configuration of a display device according to an embodiment of the present invention.

Referring to FIG. 1, a display device 10 according to an embodiment of the present invention may include a display 110, a touch sensor 130, and a controller 150.

The display 110 outputs information that is processed in the display device 10 as an image. For example, the display 110 may display a User Interface (UI) or a Graphical User Interface (GUI), and the UI or the GUI may include content (e.g., icons or widgets) that may be selected by a user.

The display 110 may include at least one of a liquid crystal display, a thin film transistor-liquid crystal display, an organic light emitting diode display, a flexible display, and/or a 3D display. Particularly, in the case where the display 110 includes a flexible display, a display region that has a curved surface may be implemented using the flexibility of the flexible display itself.

Some of the above-described displays may be configured to be transparent. These displays may be called transparent displays, and a representative example of the transparent displays may be a Transparent Organic Light Emitting Diode (TOLED). Further, depending on the implementation form of the display device 10, two or more displays 110 may be provided.

In the display 110, a plurality of display regions may be defined to output images independently. For example, the display device 10 may be provided with two or more separated display units, and images may be independently output through the respective display units. Further, the display 110 may be provided with only one display unit that defines a plurality of display regions, and images may be independently output through the respective display regions.

The touch sensor 130 may receive and sense a user's touch input. That is, when a user's touch input is generated with respect to the touch sensor 130, the touch sensor 130 may send a corresponding signal to a touch controller, and the touch controller may process the signal and transmit corresponding data to the controller 150. Accordingly, the controller 150 may recognize whether or not the touch input is generated.

The touch sensor 130 may sense the user's touch input without limits. For example, when the touch sensor 130 is configured to sense pressure, capacitance change, or mutual capacitance change, the touch sensor 130 and the display 110 may form a mutual layer structure. Accordingly, the display 110 may form a touch screen. The display 110 may perform not only a function of an output device, but also a function of an input device. That is, the touch sensor 130 may be configured to convert the pressure applied to a specific region of the display 110, or the change of the capacitance occurring at the specific region of the display 110, into an electrical signal. Accordingly, the controller 150 may recognize the region where the touch input is generated. Here, the touch input may include a real touch and a proximity touch through hovering or the like, and may further include a single touch and a multi-touch (including a double touch, a touch & drag, and a long touch).

Further, the touch sensor 130 may be configured to sense the user's touch input using a camera or an infrared sensor. Hereinafter, explanation will be made based on a case where the touch sensor 130 forms a mutual layer together with the display 110, but this is merely an example.

The controller 150 may typically control the whole operation of the display device 10, and for this, may include electrical units. For example, as such electrical units, the controller 150 may include at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, and/or microprocessors, but are not limited thereto. In particular, a controller according to embodiments of the present invention may control the display 110 to display images thereon, and may change the images displayed on the display 110 in response to a user's touch input. More specifically, the controller 150 may control the display 110 to display one or more pieces of content on at least one of the plurality of display regions, and when the touch sensor 130 senses a touch input that is generated on a first display region among the plurality of display regions, the controller 150 may control the display 110 to move the one or more pieces of content to the first display region and to display the moved content at the first display region in response to the touch input. The detailed operation of the controller 150 will be described later.

Figure 2:
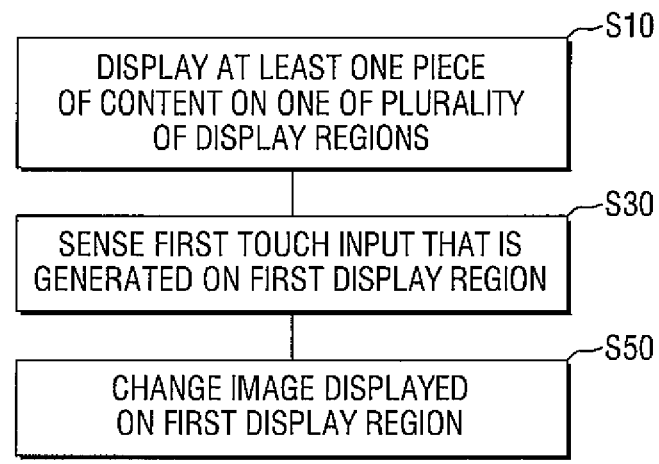
FIG. 2 is a flowchart illustrating a method for controlling a display device according to an embodiment of the present invention.

FIG. 2 is a flowchart illustrating a method for controlling a display device according to an embodiment of the present invention.

The method for controlling a display device according to an embodiment of the present invention may include displaying one or more pieces of content on any one of a plurality of display regions (S10), sensing a first touch input that is generated on a first display region (S30), and changing an image that is displayed on the first display region in response to the first touch input (S50).

Hereinafter, a display device and a method for controlling the same according to embodiments of the present invention will be described in detail with reference to examples of display screens that are changed according to the operation of the display device.

FIGS. 3, 4, 5, and 6 are example views illustrating the operation of a display device according to an embodiment of the present invention.

Figure 3:
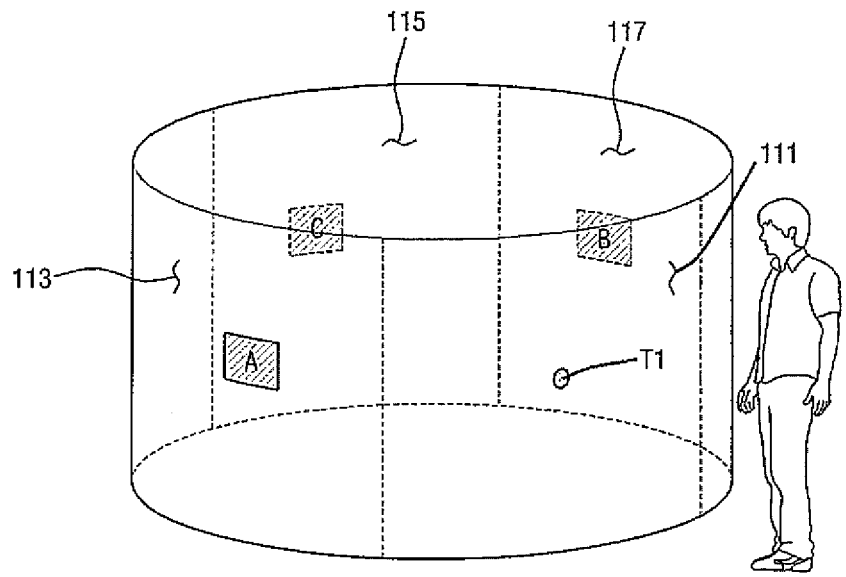
FIGS. 3, 4, 5, and 6 are example views illustrating operation of a display device according to an embodiment of the present invention.

Referring to FIGS. 1 to 6, the display 110 (see FIG. 1) illustrated in FIG. 3 may be substantially in a cylinder shape, and a plurality of display regions 111, 113, 115, and 117 may be defined at the display 110 (see FIG. 1). In the drawing, the display 110 (see FIG. 1) defines four display regions. However, this is merely an example, and the number of display regions is not limited thereto. As shown in the drawing, the plurality of display regions 111, 113, 115, and 117, on which images are displayed, may form a closed loop along the outer circumference thereof. If it is assumed that the plurality of display regions 111, 113, 115, and 117 are a first display region 111, a second display region 113, a third display region 115, and a fourth display region 117, the first display region 111 may be continuously (or uninterruptedly) coupled from the neighboring second display region 113 to the fourth display region 117. Further, the third display region 115 may be continuously (or uninterruptedly) coupled from the neighboring second display region 113 to the fourth display region 117. In the same or similar manner, the second display region 113 may be continuously (or uninterruptedly) coupled from the first display region 111 to the third display region 115, and the fourth display region 117 may be continuously (or uninterruptedly) coupled from the first display region 111 to the third display region 115.

The controller 150 (see FIG. 1) may control the display 110 (see FIG. 1) to display one or more pieces of content on at least one of the plurality of display regions 111, 113, 115, and 117. For example, under the control of the controller 150 (see FIG. 1), three pieces of content A, C, and B may be respectively displayed on the second, third, and fourth display regions 113, 115, and 117. Here, as shown in the drawing, the three pieces of content A, C, and B respectively displayed on the second, third, and fourth display regions 113, 115, and 117 may be icons, but are not limited thereto. That is, the content A, B, and C may be in the form of a page or a widget that contains specific information. That is, the shape and the type of the content A, B, and C are not limited thereto. Further, in the drawing, it is exemplified that three pieces of content A, B, and C are displayed on the plurality of display regions 111, 113, 115, and 117 under the control of the controller 150 (see FIG. 1). However, the number of pieces of content displayed on the plurality of display regions 111, 113, 115, and 117 is not limited thereto. Hereinafter, explanation will be made under the assumption that the pieces of content A, B, and C are icons, for example, a first icon A, a second icon B, and a third icon C.

The first icon A, the third icon C, and the second icon B may be fixedly displayed on specific portions of the second display region 113, the third display region 115, and the fourth display region 117, respectively, and, depending on the change of time, display positions of the first icon A, the second icon B, and the third icon C may be changed. That is, the first icon A, the second icon B, and the third icon C may gradually move in the plurality of display regions 111, 113, 115, and 117 to provide users with an effect that the first icon A, the second icon B, and the third icon C appear to be floating about in the plurality of display regions 111, 113, 115, and 117.

When a first touch input T1 is generated on one (e.g., the first display region 111) of the plurality of display regions 111, 113, 115, and 117 by a user in a state where the first icon A, the second icon B, and the third icon C are displayed on the display 110 (see FIG. 1), the touch sensor 130 (see FIG. 1) may sense the first touch input T1. In this case, as illustrated in FIGS. 4, 5, and 6, the controller 150 (see FIG. 1) may move the first icon A, the second icon B, and the third icon C to the first display region 111 and display the moved icons on the first display region 111 in response to the first touch input T1.

Thereafter, when a second touch input is generated by a user with respect to any one of the first icon A, the second icon B, and the third icon C displayed on the first display region 111, the controller 150 (see FIG. 1) performs an operation corresponding to the selected icon in response to the second touch input, and may display the corresponding operation on the first display region 111.

Accordingly, it is not necessary for a user to move to a portion where the corresponding content is displayed in order to see or select any one of the content (e.g., a page or an icon that contains specific information) that is displayed on the display region, and thus the convenience of the user is increased. In addition, since the process of moving the content may be displayed on the display, the sense of beauty may be additionally increased.

Figure 4:
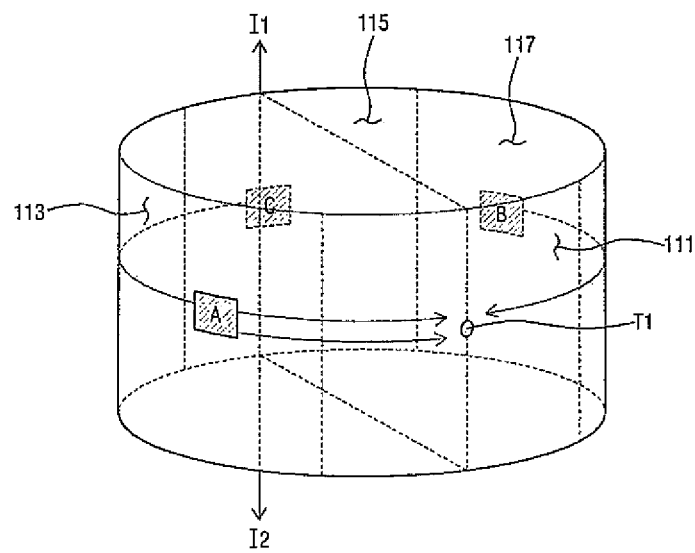
Figure 5:
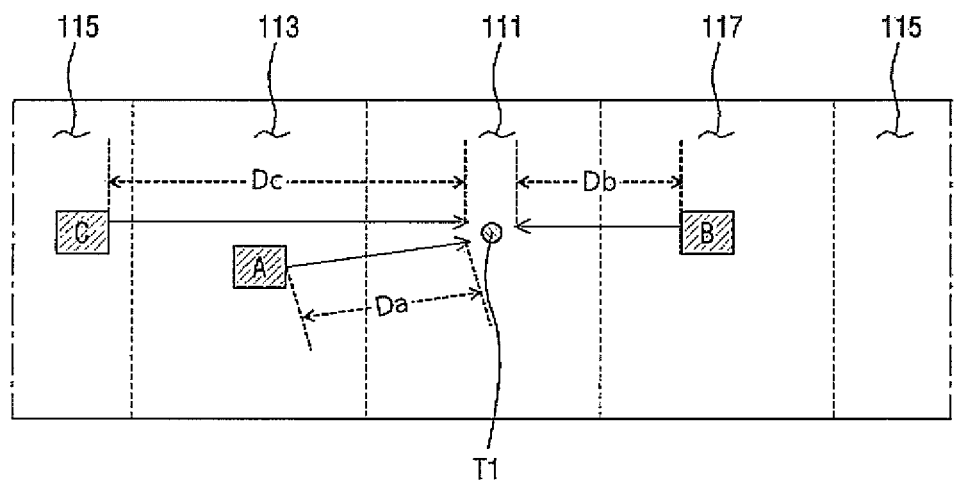
Figure 6:
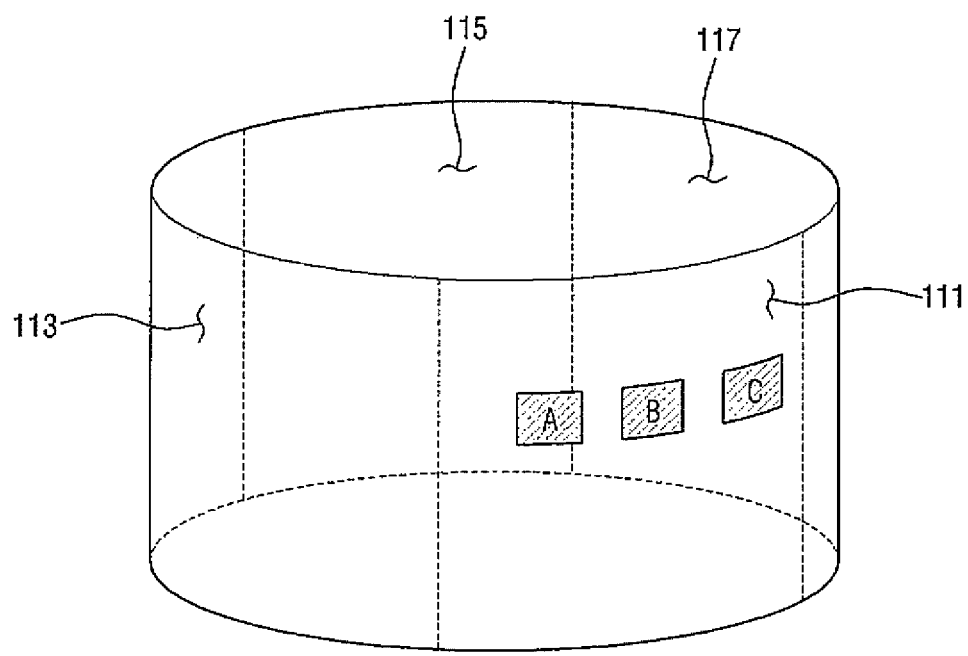

FIG. 5 is a view illustrating the movement of content (e.g., icons) on the display screen of the display device, and more specifically, is a view illustrating a plurality of display regions 111, 113, 115, and 117 shown in FIG. 4, which are cut in the direction of I1-I2 and are spread on the same plane. Here, the position of the line I1-I2 corresponds to a portion where the first touch input T1 is generated, and the distance to the line I1-I2, which is measured along the counterclockwise direction from the portion where the first touch input T1 is generated, is equal to the distance to the line I1-I2 measured along the clockwise direction from the portion where the first touch input T1 is generated.

Referring to FIGS. 4 and 5, when the first touch input T1 is generated by a user, the moving velocity of at least one of the first icon A, the second icon B, and the third icon C may be different from the moving velocity of another icon.

In an example embodiment, the moving velocities of the first icon A, the second icon B, and the third icon C may be proportional to the distances between the positions of the respective icons A, B, and C before the first touch input T1 is generated and the portion where the first touch input T1 is generated. For example, if it is assumed that the distance between the first icon A before being moved and the portion where the first touch input T1 is generated is Da, the distance between the second icon B before being moved and the portion where the first touch input T1 is generated is Db, the distance between the third icon C before being moved and the portion where the first touch input T1 is generated is Dc, and the moving velocities of the first icon A, the second icon B, and the third icon C in response to the first touch input T1 are Va, Vb, and Vc, respectively, Va, Vb, and Vc may be proportional to Da, Db, and Dc, respectively. That is, an icon (e.g., the third icon C) having a relatively long lineal distance from the portion where the first touch input T1 is generated may move faster than an icon (e.g., the first icon A or the second icon B) having a relatively short lineal distance from the portion where the first touch input T1 is generated, and thus the time when the respective icons A, B, and C are concentrated at the first display region 111 may be shortened. However, this is merely an example, and the reference gap distances between the respective icons A, B, and C may be suitably changed. Further, the moving velocities of the respective icons A, B, and C may be equal to each other.

FIGS. 7, 8A, 8B, and 8C are example views explaining a content (e.g., icon) arrangement operation of a display device according to an embodiment of the present invention, and more specifically, are views illustrating examples of a display screen at which the content is arranged in the first display region after the content moves to the first display region.

Figure 7:
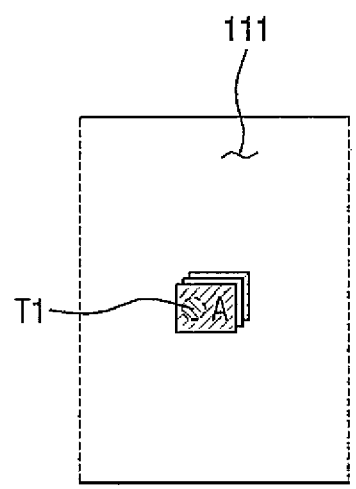
FIGS. 7, 8A, 8B, and 8C are example views illustrating a content arrangement operation of a display device according to an embodiment of the present invention.
Figure 8A:
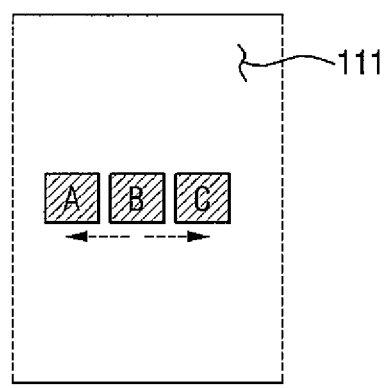
Figure 8B:
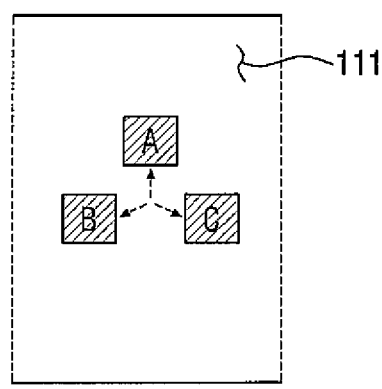
Figure 8C:
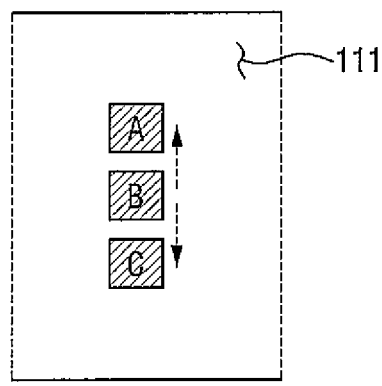

Referring to FIGS. 7, 8A, 8B, and 8C, when the first touch input T1 is, for example, a long touch that continues over a period (e.g., a predetermined time period), the first icon A, the second icon B, and the third icon C may be concentrated and arranged in the portion where the first touch input T1 is generated at the first display region 111, as illustrated in FIG. 7. Thereafter, when the first touch input T1 that has continued over the period (e.g., the predetermined time period) is released, the first icon A, the second icon B, and the third icon C may be realigned and displayed on the first display region 111. The first icon A, the second icon B, and the third icon C may be realigned in a horizontal direction as shown in FIG. 8A, in a radial direction as shown in FIG. 8B, or in a vertical direction as shown in FIG. 8C. However, these are merely examples, and are not limited thereto.

Figure 9A:
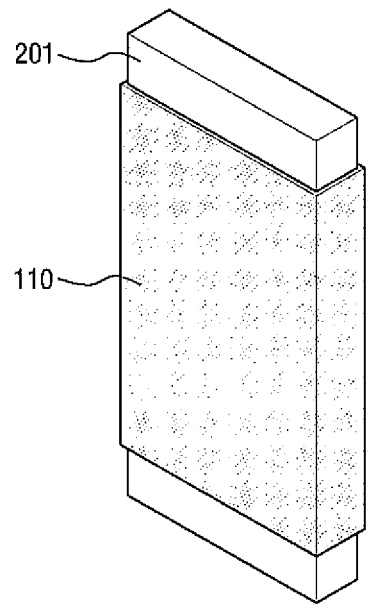
FIGS. 9A and 9B are example views illustrating shapes of a display device according to embodiments of the present invention.
Figure 9B:
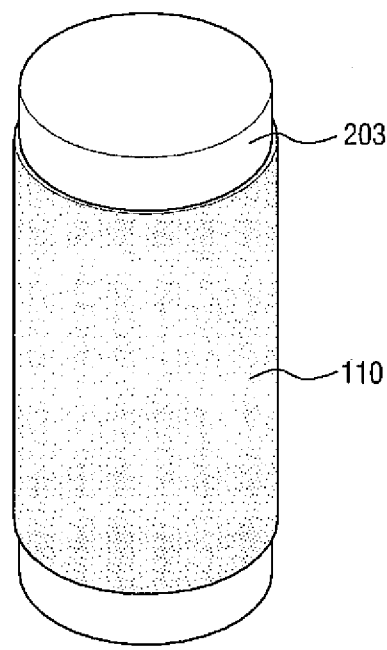

FIGS. 9A and 9B are example views illustrating shapes of a display device according to embodiments of the present invention.

Referring to FIGS. 9A and 9B, a display device according to an embodiment of the present invention may be in a shape such that an outer circumference of a body 201 that is in a prism shape is surrounded by a display 110 (see FIG. 9A), or may be in a shape such that an outer circumference of a body 203 that is in a cylinder shape is surrounded by a display 110 (see FIG. 9B). In this case, a flexible display may be used as the display 110. That is, the display device may be shaped so that the outer circumference of the body 201 or 203 in the form of a prism or a cylinder is used as the display region through the flexibility of the flexible display 110.

Figure 10A:
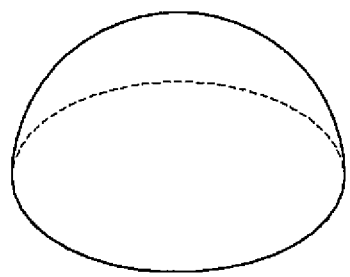
FIGS. 10A, 10B, and 10C are example views illustrating shapes of the bodies illustrated in FIGS. 9A and 9B according to embodiments of the present invention.
Figure 10B:
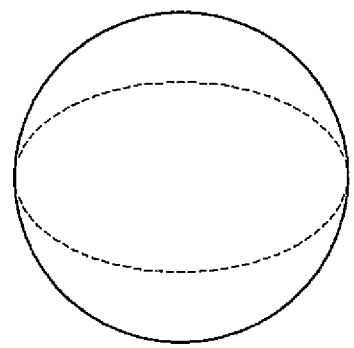
Figure 10C:
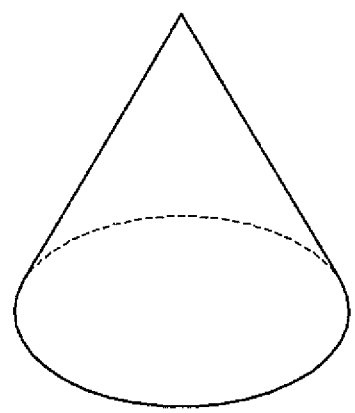

FIGS. 10A, 10B, and 10C are example views illustrating shapes of the bodies illustrated in FIGS. 9A and 9B according to embodiments of the present invention. Referring to FIGS. 9A, 9B, 10A, 10B, and 10C, the body that is applied to the display device may be in the shape of a hemisphere (see FIG. 10A), or in the shape of a sphere (see FIG. 10B). Further, the body may be in the shape of a cone (see FIG. 10C). Even in this case, a flexible display may be used as the display 110, and the display 110 may be installed along the outer surface of the body.

Further, unlike the display devices illustrated in FIGS. 10A, 10B, and 10C, the display device may be in the shape of a prism. For example, the display device may be in the shape of a rectangular prism or in the shape of a hexagonal prism. Further, the display device may be configured to display different images (e.g., content such as icons) at respective surfaces of the prism or at only a part of the respective surfaces of the prism.

Although embodiments of the present invention have been described for illustrative purposes, those skilled in the art will appreciate that various modifications, additions, and substitutions are possible, without departing from the scope and spirit of the invention as disclosed in the accompanying claims, and equivalents thereof.

What is claimed is:

1. A display device comprising:
a display having a plurality of display regions on a body that are configured to display images;
a touch sensor configured to sense a first touch input; and
a controller configured to:
control the images displayed on the plurality of display regions in response to the first touch input sensed by the touch sensor;
control the display to:
display two pieces of content at at least one of the plurality of display regions;
concurrently move the two pieces of content to a first display region from among the plurality of display regions at different moving velocities; and
display the moved content at the first display region in response to the first touch input when the touch sensor senses the first touch input generated at the first display region; and
control the moving velocity of each of the two pieces of content in direct proportion to a respective distance between a position of each of the two pieces of content before being moved and a point where the first touch input is generated, such that a second piece of the two pieces of content that is at a second distance from the point where the first touch input is generated before being moved has a second moving velocity that is faster than a first moving velocity of a first piece of the two pieces of content that is at a first distance from the point where the first touch input is generated before being moved, the first distance being shorter than the second distance.

2. The display device of claim 1, wherein when the first touch input that is sensed by the touch sensor continues over a time period, the controller is further configured to display the two pieces of content at a point where the first touch input is generated in a concentrated manner.

3. The display device of claim 2, wherein when the first touch input that continued over the time period is released, the controller is further configured to realign the two pieces of content that was concentrated and to display the realigned content at the first display region.

4. The display device of claim 1, wherein each of the two pieces of content is an icon.

5. The display device of claim 4, wherein when the touch sensor senses a second touch input for selecting the displayed icon, the controller is further configured to perform an operation corresponding to the selected icon in response to the second touch input.

6. The display device of claim 5, wherein the controller is further configured to display an operation screen, according to performance of the corresponding operation, at the first display region.

7. The display device of claim 1, wherein the display is formed at an outer circumference of the body.

8. The display device of claim 7, wherein the body has a shape of a sphere, a hemisphere, a cone, a prism, or a cylinder.

9. The display device of claim 1, wherein outer circumferences of the plurality of display regions form a closed loop.

10. The display device of claim 1, wherein the display comprises a flexible display.

11. A method for controlling a display device comprising a display configured to define a plurality of display regions, the method comprising:
   displaying two pieces of content on at least one of the plurality of display regions;
   sensing a first touch input generated at a first display region among the plurality of display regions;
   concurrently moving the two pieces of content to the first display region at different moving velocities;
   displaying the moved content at the first display region in response to the first touch input; and
   controlling the moving velocity of each of the two pieces of content in direct proportion to a respective distance between a position of each of the two pieces of content before being moved and a point where the first touch input is generated, such that a second piece of the two pieces of content that is at a second distance from the point where the first touch input is generated before being moved has a second moving velocity that is faster than a first moving velocity of a first piece of the two pieces of content that is at a first distance from the point where the first touch input is generated before being moved, the first distance being shorter than the second distance.

12. The method for controlling a display device of claim 11, further comprising displaying the two pieces of content at a point where the first touch input is generated in a concentrated manner when the first touch input continues over a time period.

13. The method for controlling a display device of claim 12, further comprising realigning the two pieces of content that was concentrated and displaying the realigned content at the first display region when the first touch input that continued over the time period is released.

14. The method for controlling a display device of claim 11, wherein the two pieces of content is an icon.

15. The method for controlling a display device of claim 14, further comprising:
   sensing a second touch input for selecting any one of the two pieces of content; and
   performing an operation corresponding to the selected one piece of content in response to the second touch input.

16. The method for controlling a display device of claim 15, further comprising displaying an operation screen, according to performance of the corresponding operation, at the first display region.

17. The method for controlling a display device of claim 11, wherein outer circumferences of the plurality of display regions form a closed loop.

18. The method for controlling a display device of claim 11, wherein the display comprises a flexible display.

* * * * *